(12) United States Patent
Laflamme

(10) Patent No.: US 7,623,248 B2
(45) Date of Patent: Nov. 24, 2009

(54) AUTOMATIC ASSET DETECTION, LOCATION MEASUREMENT AND RECOGNITION

(75) Inventor: Claude Laflamme, Dorval (CA)

(73) Assignee: GEO-3D Inc., Brossard, Québec (CA)

( * ) Notice: Subject to any disclaimer, the term of this patent is extended or adjusted under 35 U.S.C. 154(b) by 351 days.

(21) Appl. No.: 11/655,206

(22) Filed: Jan. 19, 2007

(65) Prior Publication Data

US 2007/0171431 A1 Jul. 26, 2007

Related U.S. Application Data

(60) Provisional application No. 60/760,403, filed on Jan. 20, 2006.

(51) Int. Cl.
*G01B 11/14* (2006.01)
(52) U.S. Cl. .................. 356/601; 356/614; 382/104; 701/213; 701/200; 701/208
(58) Field of Classification Search ......... 356/601–623, 356/445–448; 382/104, 165; 701/200, 207, 701/301, 213, 208, 117
See application file for complete search history.

(56) References Cited

U.S. PATENT DOCUMENTS

| | | | |
|---|---|---|---|
| 6,266,442 B1 | 7/2001 | Laumeyer et al. | |
| 6,363,161 B2 | 3/2002 | Laumeyer et al. | |
| 6,449,384 B2 | 9/2002 | Laumeyer et al. | |
| 6,453,056 B2 | 9/2002 | Laumeyer et al. | |
| 6,526,352 B1 * | 2/2003 | Breed et al. .................. | 701/213 |
| 6,625,315 B2 | 9/2003 | Laumeyer et al. | |
| 6,674,878 B2 | 1/2004 | Retterath et al. | |
| 6,891,960 B2 | 5/2005 | Retterath et al. | |
| 7,043,057 B2 | 5/2006 | Retterath et al. | |
| 7,060,981 B2 | 6/2006 | Retterath et al. | |
| 7,092,548 B2 | 8/2006 | Laumeyer et al. | |
| 7,173,707 B2 | 2/2007 | Retterath et al. | |
| 7,411,681 B2 | 8/2008 | Retterath et al. | |
| 7,444,003 B2 | 10/2008 | Laumeyer et al. | |
| 7,515,736 B2 | 4/2009 | Retterath et al. | |
| 2002/0106109 A1 * | 8/2002 | Retterath et al. ............. | 382/104 |
| 2004/0247157 A1 * | 12/2004 | Lages et al. .................. | 382/103 |
| 2006/0095207 A1 * | 5/2006 | Reid .......................... | 701/301 |
| 2007/0061066 A1 * | 3/2007 | Bruelle-Drews ............ | 701/200 |

* cited by examiner

*Primary Examiner*—Hoa Q Pham
(74) *Attorney, Agent, or Firm*—Ogilvy Renault, LLP

(57) ABSTRACT

From a survey vehicle, two types of data are obtained: images from a camera and reflections from a laser. The laser data is filtered in order to detect assets. The detected assets are then processed to locate and measure the assets. Once this information has been obtained, it is combined with the images captured by the camera in order to recognize the assets.

19 Claims, 3 Drawing Sheets

AUTOMATIC ASSET DETECTION, LOCATION MEASUREMENT AND RECOGNITION

CROSS-REFERENCE TO RELATED APPLICATIONS

The present claims priority of U.S. Provisional Patent Application No. 60/760,403 filed on Jan. 20, 2006.

TECHNICAL FIELD

The present invention relates to the field of automated asset management systems, and more specifically, to devices and methods used to detect, locate geographically, measure, and recognize objects found within right-of-ways.

BACKGROUND OF THE INVENTION

Several factors act as incentives for public and private organizations to build the equipment inventory of their infrastructure network. These may originate due to legislature or are associated with operations relative to maintenance, procurement, traffic, valuation, or safety and emergency response issues.

Geographic information systems (GIS) are used to meet these goals in several fields, including those of transportation, electric distribution, and property assessments. Meanwhile, asset managers are interested in populating their customized GIS applications using either data conversion or data collection techniques. This may require that data captured be converted into a proper GIS format. Although this technique is widely used because it is reasonably economic, it is not as accurate as field data collection.

For field collection, a crew of technicians gather relevant information in the field, using either a Global Positioning System (GPS) receiver combined with data logging devices, or palm computers equipped with GPS receivers. However, proceeding to an infrastructure network inventory by traditional surveying or GPS foot survey methods may prove to be a tedious and costly operation. Furthermore, constraints for some organizations may translate into difficulties maintaining network data up-to-date. This prevents managers from completing efficient planning over time to orient organizational development.

SUMMARY OF THE INVENTION

The present invention presents an alternative solution to field data collection. There is described a method and system for detecting, locating geographically, measuring, and/or recognizing objects found within right-of-ways.

The objects in question may be varied, for example a road sign, guard-rail, pavement marking, tree, light pole, telecommunication pole, electric pole, curb, sidewalk, shoulder, etc.

In accordance with a first broad aspect of the present invention, there is provided a method for asset inventory using a survey vehicle, the method comprising: concurrently capturing images on a camera as the vehicle advances and assigning geographical locations to the images, and emitting a beam of light from a laser mounted on the vehicle and capturing laser data reflected off of various objects; detecting an object of interest from the various objects by processing the laser data using at least one parameter unique to the object; locating the object of interest geographically by aggregating proximal laser scanned points into a single object and identifying an (X,Y,Z) position thereof; measuring the object of interest by approximating object size of the single object; and recognizing the object of interest by locating the single object in one of the images captured by the camera.

In accordance with a second broad aspect of the present invention, there is provided a survey vehicle comprising: at least one two-dimensional laser scanning device; reception means to capture laser data reflected off various objects; at least one camera for capturing images as the vehicle advances; a positioning system to attach geographical locations to the images; and a data capture computer adapted to receive the laser data and the images.

In a preferred embodiment, the survey vehicle may also comprise a positioning sub-system, including an orientation system. The camera may be video or digital. The two-dimensional scanning laser device may have intensity and color measurements.

In another preferred embodiment, the scanning laser device and the reception means are the same device, such as the Riegl™ LMS-Q120 industrial scanner laser.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The system of the present invention can be used to perform the inventory of roadside infrastructure assets and features managed by transportation authorities (roads, public transit, railways, etc), utilities (telecommunications, electric distribution, etc), and municipalities. It is also possible to plan and monitor linear rights-of-ways (roads, railways, pipelines, electric transmission lines, etc) as well as shore evolution.

Data collection occurs in two phases. The first phase involves geo-referenced image and/or laser data collection performed on-board a land or rail vehicle. The second phase involves data extraction. This may be done either onboard the vehicle if the appropriate software is provided, or it may be undertaken by a computer that is not onboard the vehicle. A preferred embodiment of the system is based on the use of data acquisition and extraction software components coupled to high resolution cameras, 2D laser scanning devices, and/or positioning systems. The output of the automated extraction process consists of a database of stored GIS layers. The layers can be stored, for example, in a relational database where a table corresponds to a layer or to a class of objects. The database is connected to the automated extraction software and is populated in real time during the extraction process.

Figure 1:
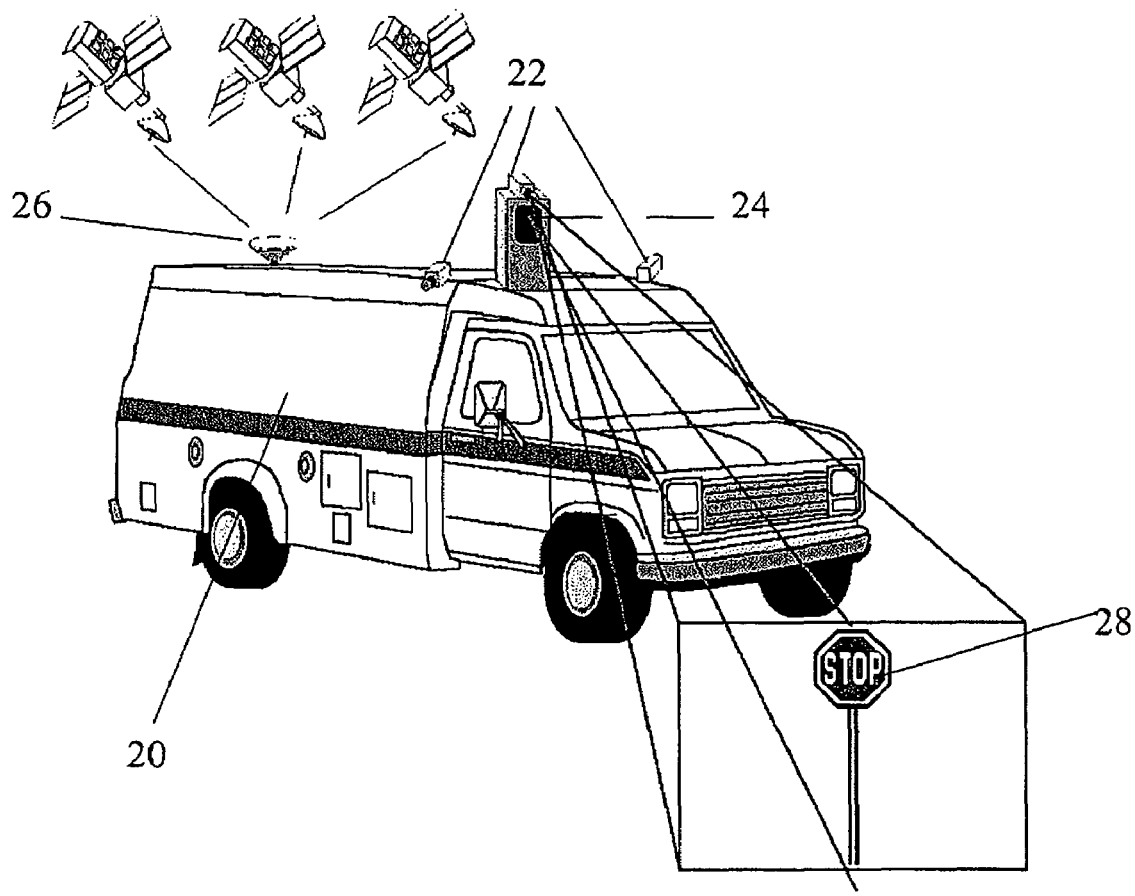
FIG. 1 illustrates the survey vehicle with the camera and laser scanning device mounted thereon in accordance with one embodiment of the present invention.

FIG. 1 illustrates a survey vehicle 20 in accordance with a preferred embodiment of the present invention. One or more cameras 22 and at least one laser scanning device 24 are mounted on a road vehicle 20, such as a mini-van, in order to acquire data as the vehicle advances at traffic speed. The camera 22 can be a video camera or a digital camera capable of capturing images from a triggered signal. The 2D laser scanning device 24 has at least range and angle measurement outputs. Intensity and color measurements are optional features the scanning device 24 may also have. At least one GPS antenna 26 is also present on the survey vehicle 20, in combination with a positioning system (with or without an orientation system). Software components are then present to perform synchronization and data capture from the devices (22, 24, 26) in real time.

The laser scanning device 24 is positioned to scan the road side laterally in order to detect objects 28 on the side of the right-of-way. The laser 24 is oriented with a heading angle different than that of the vehicle to ensure hits on surfaces perpendicular to the right-of-way. The laser 24 can be installed to scan horizontally in front or in back of the vehicle 20, to scan and map pavement lines and measure right-of-way profiles. The cameras 22 are installed at any heading and tilt angle.

System calibration is used to ensure proper sensor registration. The interior orientation of the cameras 22 are calibrated prior to their installation on the vehicle 20. Exterior orientation of the cameras 22 are calibrated prior to survey using calibration sites with known control points. Exterior orientation of the laser scanning device 24 is calibrated using known control points and retro-reflecting material for easy target identification.

With respect to the data extraction phase of the process, this can be done by a combination of various software tools. Known mobile mapping tools may be used to attach geographic locations to camera images while driving. These images can be used with other software tools for analysis, or can be used as a visual GIS layer.

The system of the present invention may include data acquisition software to manage different system components, 640×480 or greater pixel resolution cameras, a positioning system (GPS, DMI and/or IMU), hard disks with removable trays to record geo-referenced imagery in real time on the field, and an electrical powering system for all of the above (power supply, cables, peripherals, etc). Only one camera is required to enable stereoscopy, but more may be used if desired. As many cameras with the preferred orientation (frontal, lateral, etc) may be integrated during a survey to complement information collected. One or more 2D laser scanning devices may be used if desired with preferred orientation.

Each captured image is further geo-referenced according to a geographic coordinate system. During image capture operations, specific attributes are associated to each individual image. During capture, images are recorded to AVI files or JPG folders. Each image has a reference to a geographic location from a GPS receiver, time and date in Universal Time Code (UTC) format, linear information from a Distance Measurement Instrument (DMI), orientation of the platform if an orientation sub-system is present, as well as information regarding the quality of the GPS solution and the accuracy of recorded coordinates.

The method of a preferred embodiment of the present invention can be broken down into a series of steps, namely detection (finding an object of interest), location (positioning geographically the object), measurement (defining the object size, using height, height above ground, etc), recognition (regrouping objects of interest of a same type, such as road sign, tree, pole, guardrail, etc), and classification (the object is identified and can be classified in a database of objects of the same type).

Detection of object of interest is performed by searching the laser data stream (or point cloud) for specific object features such as shape, location in space and/or other characteristics. Location consists of an aggregation of laser scanned points into single objects. This aggregation uses proximity: points belonging to a same object are close by. The filter used for this step can be adjusted to vary the proximity requirement (i.e. how close does a point need to be to belong to the same object). Once the points have been regrouped, a centroid is computed (averaged X, Y, Z attributes) and this becomes the object location. For objects that span along the road over certain parametric distances, extremity points are computed instead of a unique centroid. Points are added between the extremities to produce linear objects.

Object measurement is done by computing the extent (or bounding box) of the aggregated set of points for each object. Using laser orientation, frequency, scans per second, and/or traveling speed, a threshold is used to best approximate object size.

Object classification/recognition is based on one or more of the following object classification characteristics: retro-reflection properties (road signs), morphology (trees, poles), size (guard-rails), height, distance from road, etc. For certain types of objects (classes), it is useful to find the exact object model. For example, for a stop sign, its class (or GIS layer) is a road sign, but the exact model is a stop sign. Typically, for road signs, recognizing consists of finding the MUTCD (Manual on Uniform Traffic Control Devices) code of the sign. Most other objects other than road signs do not need any further processing than recognition. For certain objects, such as guardrails, attachment point types need to be recognized.

Figure 2:
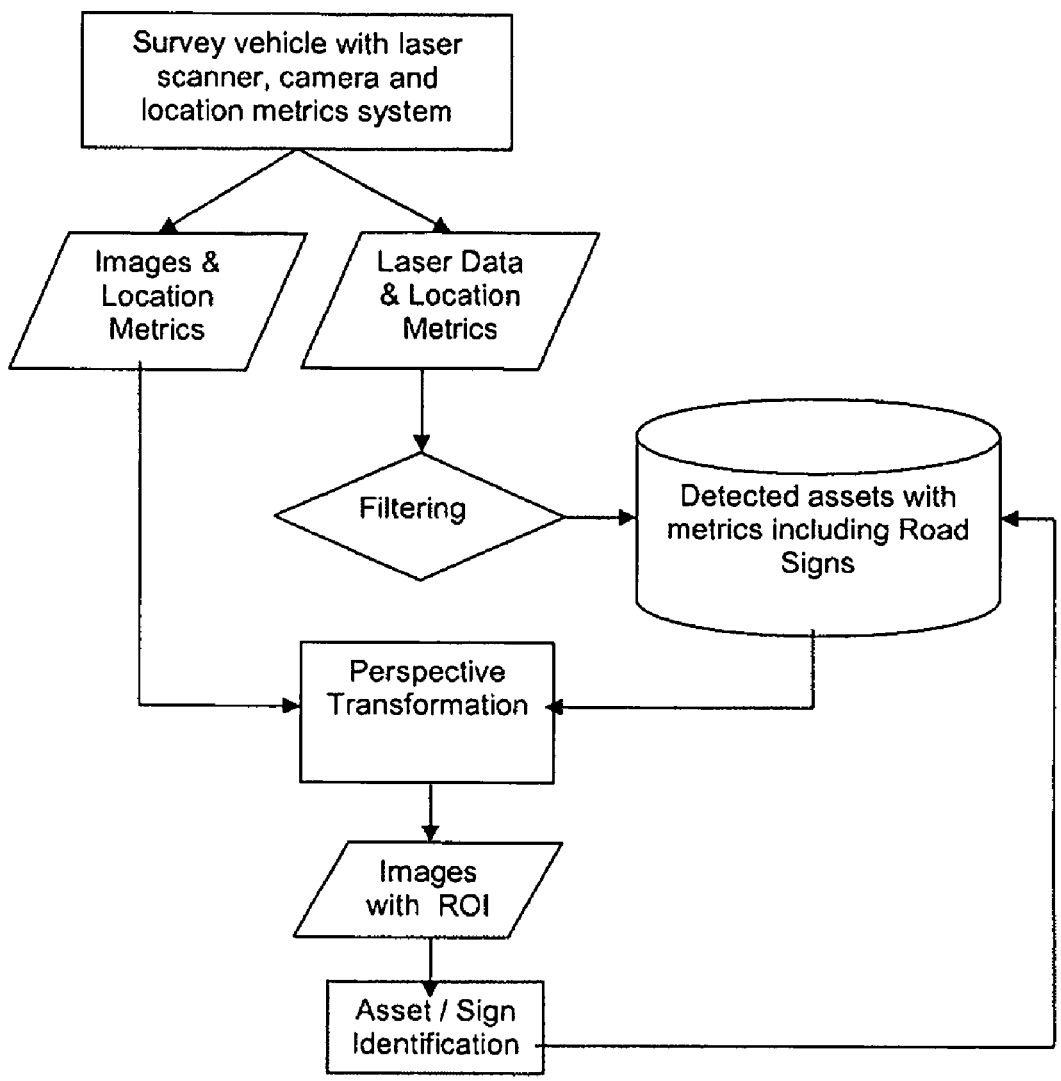
FIG. 2 is a flowchart illustrating one embodiment of the method of the present invention for asset identification.

FIG. 2 illustrates the process of asset identification from beginning to end, in accordance with a preferred embodiment of the present invention. From the survey vehicle, two types of data are obtained: images from the camera and reflections (range and angle) from the laser. The laser data is filtered in order to detect assets. The detected assets are then processed to locate and measure the assets. Once this information has been obtained, it is combined with the images captured by the camera in order to recognize the assets. To locate the image (or frame) comprising the object of interest previously detected, the known orientation and field of view of the camera is used. A perspective transformation is then applied to the detected object in order to go from geographic coordinates (world coordinates) to image coordinates, i.e. 3D to 2D. The detected object has known coordinates ($X_0$, $Y_0$, $Z_0$) and dimensions. In order to find the object on the image (or the ROI), the 3D coordinates of the object bounding box are translated into the 2D coordinates available on the image. The region of interest, including the detected object, can then be located in the image and the asset can be recognized and/or classified.

Figure 3:
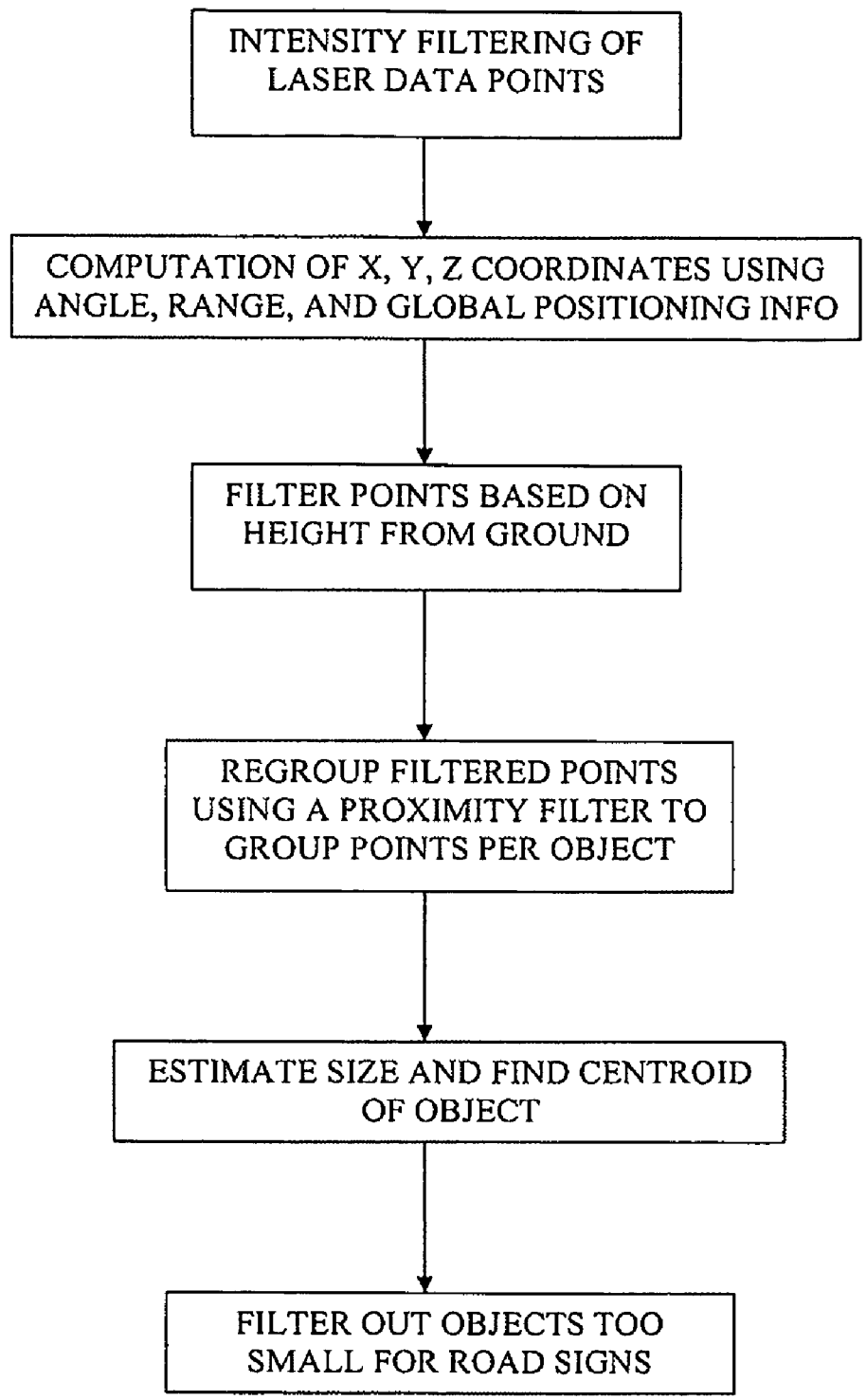
FIG. 3 is a flowchart illustrating one embodiment of the method of the present invention for detecting road signs.

FIG. 3 illustrates a preferred method to be used for the automated detection of road signs. Initially, laser data is captured and images are concurrently captured and assigned geographic locations. The laser data is then scanned for points with high intensity by a filtering process. Since road signs exhibit high retro-reflective properties, the intensity value of the laser data points will make the points reflected off of road signs stand out with respect to other points reflected off of other objects. The coordinates X, Y, Z are computed for the points of interest using angle, range, and global positioning information. Points are then filtered once again, this time based on their height from the ground. The filtered points are re-grouped using a proximity filter to identify points that belong to a same object. The objects that are identified are estimated for size and a centroid (unique object location) is computed. Objects are then filtered based on size to eliminate those that are too small to be road signs.

For recognition of road signs, the images captured by the camera are used. From the object location and size, and using photogrammetry functions, it is possible to find the region of interest in an image where the sign appears. Using the known camera angle and its angle of view, the closest image showing the road sign is identified. Using 3D to 2D photogrammetry projection techniques, the region of interest containing the road sign in the image is found. From the image region of interest, a template-matching algorithm along with a database of predefined road signs is used to recognize automatically the road sign and extract its corresponding MUTCD code.

In the case of objects such as road signs, it is possible to obtain a measurement of the quality of the retro-reflection. From the laser data, after road sign detection filtering, the average intensity of the reflected signal is computed from the laser measurements (if available from the laser scanner). The average intensity is computed from the points that belong to the sign (same points as for the centroid calculation). The output value is a percentage of the reflected signal strength. It can be transformed to "Candela per sq. meter (cd/m$^2$) or lumens" if required.

In a preferred embodiment, the laser used is the RIEGL™ LMS-Q120 2D—laser scanner. It provides non-contact line scanning using a near infrared laser beam. The instrument makes use of the time-of-flight laser range measurement principle and of fast line scanning by means of a high-speed opto-mechanical scan mechanism, providing fully linear, unidirectional and parallel scan lines. As for the camera, a Sony DFW-SX910 may be used. The DFW-SX910 features a ½" CCD that delivers uncompressed, high-resolution, digital color images and features an easy-to-use asynchronous electronic shutter function with an exposure range from $1/100,000$ to 17.5 seconds, allowing for the clear capture of fast moving objects or still images in low light environments. It should be understood that alternative lasers and cameras may be used without deviating from the present invention.

The embodiments of the invention described above are intended to be exemplary only. The scope of the invention is therefore intended to be limited solely by the scope of the appended claims.

I claim:

1. A method for asset inventory using a survey vehicle, the method comprising:
   concurrently capturing images on a camera as said vehicle advances and assigning geographical locations to said images, and emitting a beam of light from a laser mounted on said vehicle and capturing laser data reflected off of various objects;
   detecting an object of interest from said various objects by processing said laser data using at least one parameter unique to said object;
   locating said object of interest geographically by aggregating proximal laser scanned points into a single object and identifying an (X,Y,Z) position thereof;
   measuring said object of interest by approximating object size of said single object; and
   recognizing said object of interest by locating said single object in one of said images captured by said camera.

2. A method as claimed in claim 1, wherein said recognizing said object comprises classifying said object of interest according to a specific object type.

3. A method as claimed in claim 2, wherein said recognizing said object comprises classifying said object of interest according to a specific object model of a given object type.

4. A method as claimed in claim 3, wherein said classifying comprises using a template-matching algorithm with a database of predefined object models.

5. A method as claimed in claim 1, wherein said processing said laser data comprises using at least one of retro-reflective properties, morphology, size, and height to detect said object of interest.

6. A method as claimed in claim 1, wherein said detecting comprises using at least two parameters unique to said object.

7. A method as claimed in claim 1, capturing images comprises obtaining data regarding a quality and accuracy of said geographical locations assigned to said images.

8. A method as claimed in claim 1, wherein said locating said object of interest geographically comprises determining a centroid thereof 9. A method as claimed in claim 1, wherein said recognizing comprises using known orientation and field of view of the camera to identify an image comprising said object of interest, and translating said (X,Y,Z) coordinates into two-dimensional coordinates available on said image.

10. A survey vehicle comprising:
    at least one two-dimensional laser scanning device;
    reception means to capture laser data reflected off various objects;
    at least one camera for capturing images as said vehicle advances;
    a positioning system to attach geographical locations to said images; and
    a data capture computer adapted to;
       receive said laser data and said images;
       detect an object of interest from said various objects by processing said laser data using at least one parameter unique to said object;
       locate said object of interest geographically by aggregating proximal laser scanned points into a single object and identifying an (X,Y,Z) position thereof;
       measure said object of interest by approximating object size of said single object; and
       recognized said object of interest by computing a location of said single object in one of said image capture by said camera.

11. A survey vehicle as claimed in claim 10, wherein said data capture computer classifies said object of interest according to a specific object type.

12. A survey vehicle as claimed in claim 11, wherein said data capture computer classifies said object of interest according to a specific object model of a given object type.

13. A survey vehicle as claimed in claim 12, wherein said data capture computer uses a template-matching algorithm with a database of predefined object models to classify said object.

14. A survey vehicle as claimed in claim 10, wherein said laser scanning device is a laser having a near infrared laser beam which uses time-of-flight laser range measurement principles and fast line scanning means.

15. A survey vehicle as claimed in claim 10, wherein said camera is a digital signal-triggered camera.

16. A survey vehicle as claimed in claim 10, wherein said laser scanning device has at least one of intensity and color measurement features.

17. A survey vehicle as claimed in claim 10, wherein said positioning system has an orientation system.

18. A survey vehicle as claimed in claim 10, wherein said laser scanning device is positioned to scan a road-side laterally.

19. A survey vehicle as claimed in claim 10, wherein said laser data includes a measurement of a quality of a retro-reflection.

* * * * *